No. 889,990. PATENTED JUNE 9, 1908.
H. P. TIPPETT.
MECHANICAL STOKER.
APPLICATION FILED SEPT. 18, 1905.

WITNESSES:
Carl Stoughton

INVENTOR
Harold P. Tippett
BY
ATTORNEYS

Fig. 3.

No. 889,990. PATENTED JUNE 9, 1908.
H. P. TIPPETT.
MECHANICAL STOKER.
APPLICATION FILED SEPT. 18, 1905.
6 SHEETS—SHEET 5.

WITNESSES:
Carl Stoughton

INVENTOR
Harold P. Tippett,
BY
ATTORNEYS

UNITED STATES PATENT OFFICE.

HAROLD P. TIPPETT, OF COLUMBUS, OHIO.

MECHANICAL STOKER.

No. 889,990. Specification of Letters Patent. Patented June 9, 1908.

Application filed September 18, 1905. Serial No. 278,846.

*To all whom it may concern:*

Be it known that I, HAROLD P. TIPPETT, citizen of the United States, residing at Columbus, in the county of Franklin and State of Ohio, have invented certain new and useful Improvements in Mechanical Stokers, of which the following is a specification.

My invention relates to new and useful improvements in mechanical stokers.

This invention has for its object more particularly certain improvements in the construction of the mechanical stoker forming the subject matter of the patent of Morris B. Brewster, issued Nov. 7th, 1905, No. 803,805, but while differing somewhat in construction, involves the same fundamental principle.

Among the novel features are the provision of high and low pressure cushioning means; a distributing table; and provision for first delivering the fuel to the distributing table and then subjecting the fuel to a steam blast to effect the distribution, thus allowing the fuel to arrive at the table prior to the steam blast, thereby preventing excess steam in the combustion chamber.

Another feature resides in means arranged in the blast pipe whereby the passage of steam to the manifold and ejector may be regulated according to the pressure, without changing the adjustment of the valves controlling the individual jets of the ejector.

Still another point is set forth in the oscillating bucket and its operating means whereby a compact and efficient device is had.

Finally the object of the invention is to provide a device of the character described which will occupy a comparatively small space, and be strong and durable and whose parts will not be liable to get out of working order.

With the above and other objects in view, the invention consists of the novel details of construction and operation, a preferable embodiment of which is described in the specification and illustrated in the accompanying drawings, wherein—

Fig. 8 is a plan view of the ejector and the manifold, Fig. 9 is a vertical sectional view of the piston valve, a portion of the piston and its operating crank being shown in elevation, Fig. 10 is a like view taken at right angles thereto, and, Fig. 11 is a vertical sectional view of the manifold taken on the line $c$ $c$ of Fig. 2.

Figure 1:
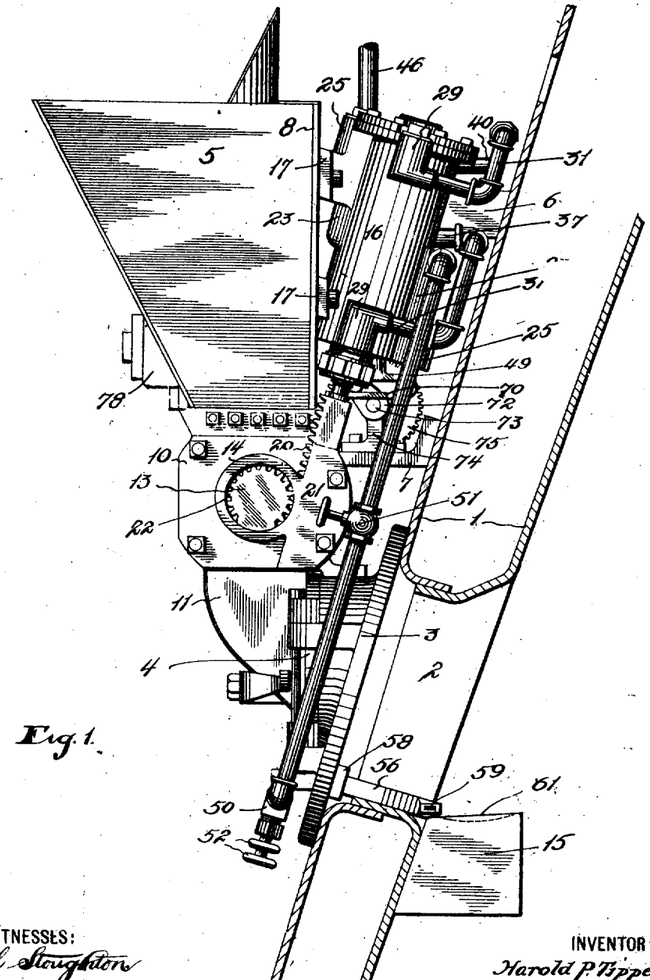
Figure 1 is a partial vertical sectional view of the front end of a furnace, showing my improved mechanical stoker in side elevation arranged thereon.
Figure 2:
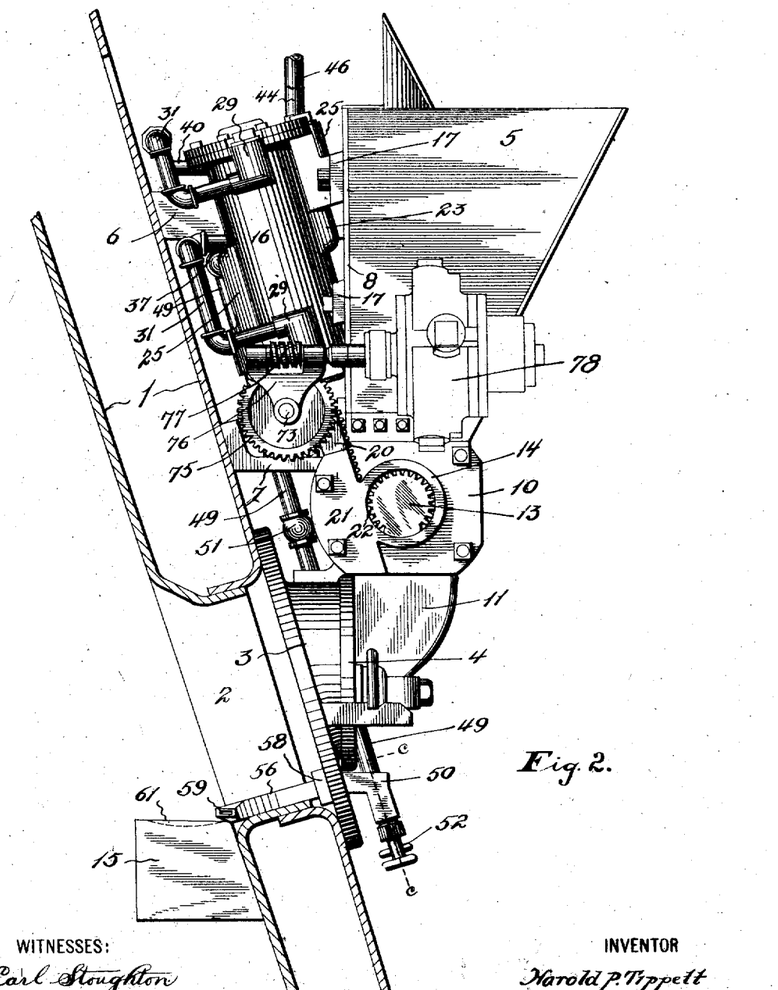
Fig. 2 is a similar view to Fig. 1, showing the opposite side of the stoker.
Figure 4:
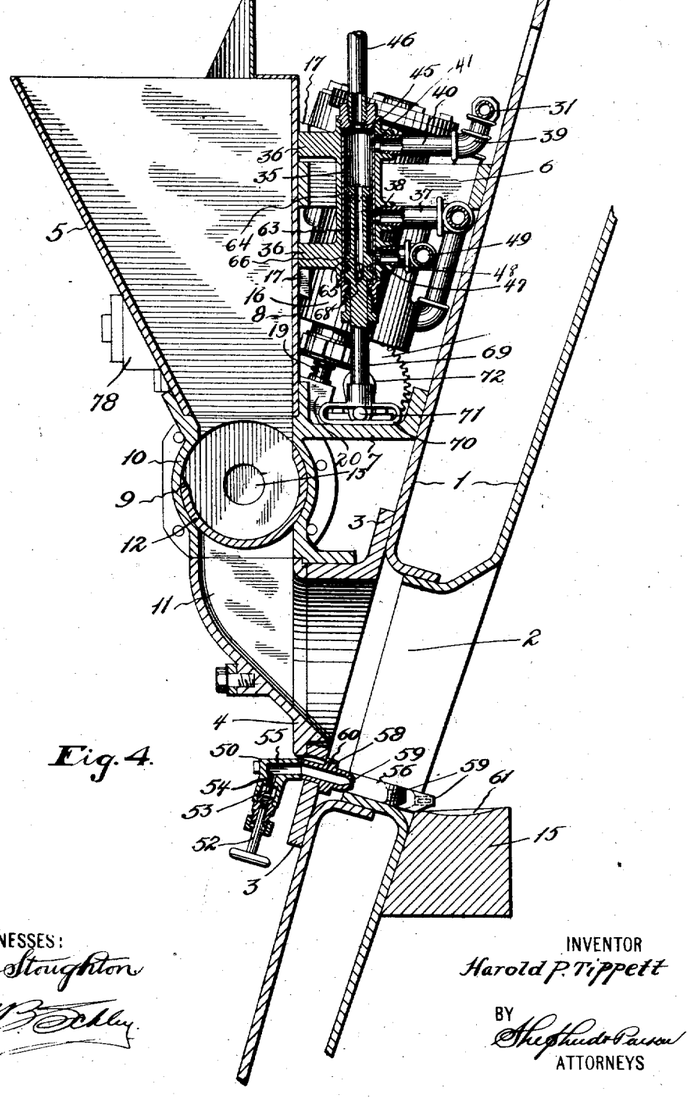
Fig. 4 is a vertical sectional view taken on the line $x$ $x$ of Fig. 3.

In the drawings, the numeral 1 designates the double front wall of a furnace which is generally arranged on an incline, as shown in Figs. 1, 2 and 4. The furnace is provided with the usual fuel opening 2 about which is arranged the door frame 3 on which a fire door 4 is swingingly mounted. Arranged above the fire door some distance is a fuel feeding hopper or compartment 5 supported from the front wall 1 by an angular bracket or frame 6 at its upper portion. At the lower end of the hopper, a valve or bucket casing 10 is provided so as to support the hopper and have communication therewith, the said casing being itself supported upon the door-frame 3 and having a brace 7 extending to the front wall 1 and suitably connected therewith. Beneath the bucket casing and having communication therewith is a downwardly curved and inclined discharge chute 11. This chute is preferably supported on the door 4 and formed integral therewith, so that it may be swung with the same to permit free access to the door frame 3 and the fuel opening 2. The bucket casing is provided with an inner annular bore so as to receive a cylindrical valve or bucket 12, the said bucket being formed at each end with hollow trunnions 13 which are supported in annular bearing collars 14 formed at each end of the casing. The bucket while cylindrical in form has about one-third of its periphery cut away, so that the fuel from the hopper will readily enter it. In its normal or loading position the bucket has one edge or end of its cylindrical wall terminating flush with the rear wall 8 of the hopper 5, while the opposite end or edge of the wall terminates some distance below the opening in the casing and is reduced so as to form a shearing edge as indicated at 9 in Fig. 4. This shearing edge is provided so as to cut through the coal at the lower end of the hopper and permit the bucket to be rotated or oscillated and by positioning the shearing edge at the point indicated in Fig. 4, the bucket is allowed some movement so as to get a start before the shearing action takes place. When the bucket is inverted by a partial revolution, it will discharge its contents into the chute 11 and at the same time close the lower end of the hopper or in other words, attain its unloading or discharging position. The fuel delivered into the chute 11 passes down the same by gravity through the door-frame 3 and the fuel opening 2 on to the fuel distributing table 15 from which it will be distributed to the various parts of the combustion chamber or fuel box not shown, the said distribution being accomplished by means of a fluid under pressure, as will be hereinafter described.
For the purpose of operating the fuel bucket 12, I provide a pair of steam cylinders 16 supported over the ends of the bucket casing by means of integral brackets 17 secured to the rear side of the vertical hopper wall 8.
Each of the cylinders 16 is provided with an elongated hollow piston head 18 suitably secured on the end of a piston rod 19 which projects beyond the lower end of the cylinder as clearly set forth in Figs. 5 and 6. The lower end of each piston rod 19 is secured to the upper end of a rack bar 20. The rack bars 20 are suitably supported so as to reciprocate in guides 21 formed on the rear sides of the bearing collars 14 and to engage with mutilated gears 22 formed in the outer peripheries of the trunnions 13. The parts are so positioned that when the piston heads 18 are at the end of their upward strokes, the lower portion of the rack bars 20 will be in engagement with the gears 22 and the bucket in its loading position as shown in Fig. 4. By this arrangement the bucket will be inverted by the downward strokes of the piston heads, so that the weight of the parts is utilized in inverting the bucket and shearing off the coal at the bottom of the hopper, it being apparent that if the piston head were not held up by steam pressure, they would fall by gravity. It has been found that in order to prevent undue vibration and shock, the piston heads should be cushioned at each end of their strokes and with this object in view, I have provided on each cylinder enlargements 23 which extend on opposite sides from the central portion to each end as clearly shown in Fig. 5. Passages 24 are provided in these enlargements extending to the bore of the cylinder and positioned on opposite sides so that one passage is always covered by the piston head and the other exposed when the piston head approaches the end of its stroke so as to have communication with the interior of the cylinder. It might be here stated that as the cylinders 16 and their parts are of the same construction, a description of one will suffice for both. The passages 24 terminate in valve chambers 25 in each of which is arranged a suitable check valve 26 seating toward the passage and held in position by a spring cap 27. Short ports 28 lead from the valve chamber to the cylinder. Steam entering either of the passages 24 from the cylinder, will pass to the valve chamber 25 unseat the valve 26 against the pressure of its spring cap 27 and reënter the cylinder by way of the ports 28, thus coming in front of the piston head and cushioning the same at the end of its stroke. The back pressure or compression of the steam admitted in this way, will assist the spring cap in seating the valve 26 and holding it to its seat against the pressure of the live steam admitted to the valve chamber by the passage 24. The piston head is of such length as to keep the passages 24 covered during the greater portion of the stroke, so that one of the passages 24 is uncovered or exposed just before the piston reaches the end of its stroke, to permit just enough steam to pass through the passage 24 into the valve chamber 25 and through the port 28 to cushion the piston at the extreme end of its stroke. This final cushioning action follows a general cushioning of the piston which will be hereinafter described.

Figures 5, 6, 7:
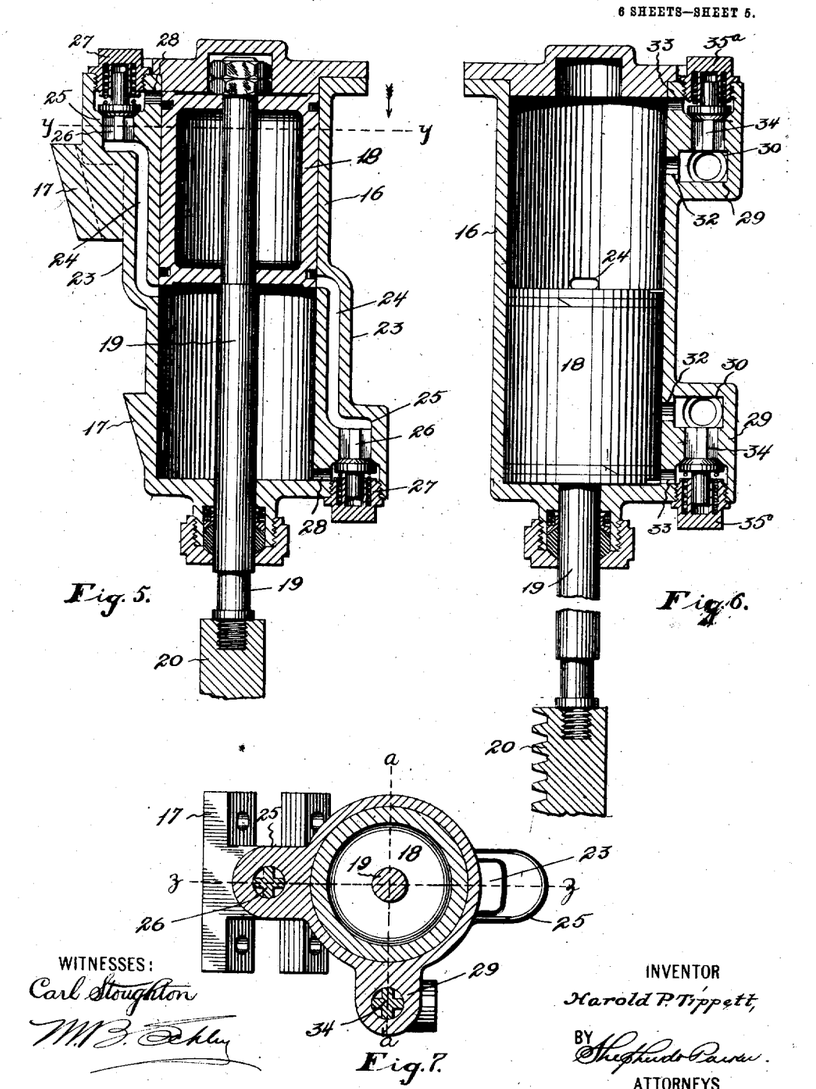
Fig. 5 is a vertical sectional view through one of the steam cylinders, taken on the line $z$ $z$ of Fig. 7.
Fig. 6 is a similar view taken on the line $a$ $a$ of Fig. 7.
Fig. 7 is a cross sectional view of one of the steam cylinders taken on the line $y$ $y$ of Fig. 5 and looking in the direction of the arrow.

For supplying and exhausting steam to the cylinder, I provide on one side at each end thereof and preferably at right angles to the cushioning enlargements, valve chambers 29 (see Figs. 6 and 7). The valve chambers 29 are each formed with ports 30 into which branch pipes 31 are introduced. Adjacent the ports 30, ports 32 are provided in the wall of the cylinder so as to establish communication between the interior of the cylinder and the valve chamber, the said ports being arranged some distance from each end of the cylinder, while at each extreme end of the cylinder, ports 33 are provided through the wall of the cylinder having communication with the valve chamber 29. In each of the valve chambers 29 a suitable check valve 34 is provided seating toward the ports 30 and 32 and held in position by a spring cap 35ª, so that fluid under pressure entering through either of the ports 30 will unseat the valve and pass through the port 33 into the cylinder, while a fluid under pressure passing from the cylinder through either of the ports 33 will merely hold the check valve 34 to its seat and thus be confined. The ports 30 alternately act as inlet ports and exhaust ports, the admission and exhaustion of the steam through the said ports being controlled by means hereinafter described.

Referring to Fig. 6, the piston head 18 is shown at the end of its downward stroke and the port 32 of the lower valve chamber closed by the piston. Steam entering through the port 30 unseats the valve 34 and passes through the port 33 behind the piston, the latter being cut away for that purpose. Steam entering behind the piston drives the same upward until the port 32 is uncovered when the steam will cease to pass by the valve 34 and pass directly out through the port 32. As the piston head 18 is forced upward, the exhaust steam passes out through the ports 32 and 30 of the upper valve chamber 29 until the piston head reaches and passes the port 32 which will thus be closed. After the piston passes the upper port 32, a gradual cushion is produced during the remainder of the upward movement; the upper valve 34 being held to its seat by the pressure and the cushion thus maintained. At the extreme end of the upward movement, the upper passage 24 is uncovered and live steam admitted above the piston to effect the final cushioning hereinbefore described. Steam is now admitted through the upper port 30 and passes by the upper valve 34 unseating the same and enters the cylinder above the piston through the upper port 33, thus forcing the piston downward, the same operations taking place as on the upward stroke of the piston.

Figure 3:
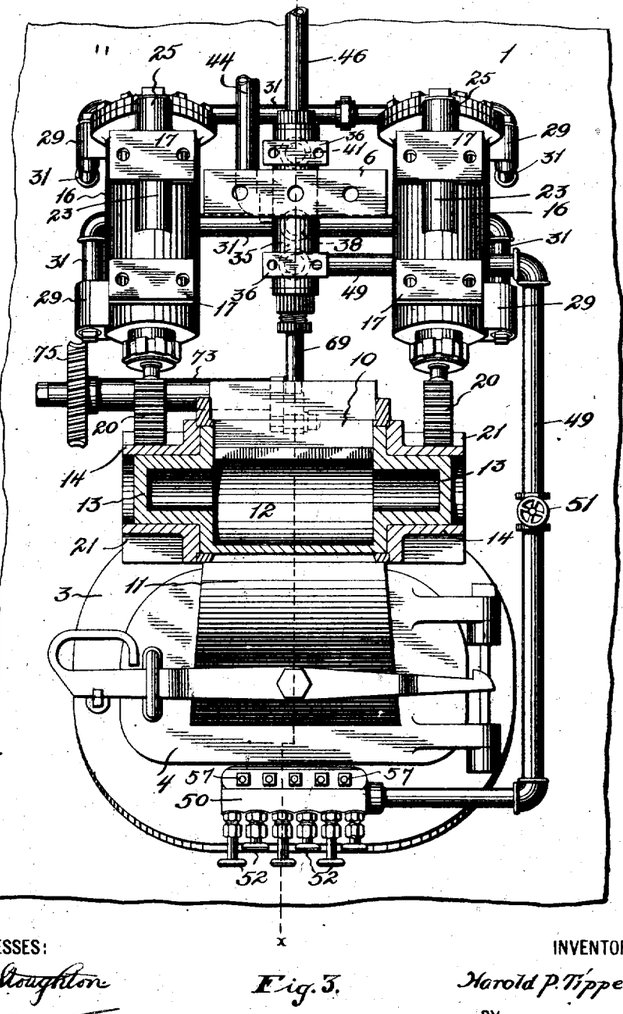
Fig. 3 is a front elevation with the hopper removed, the bucket and its support being shown in vertical section.
Figures 8, 9, 10, 11:
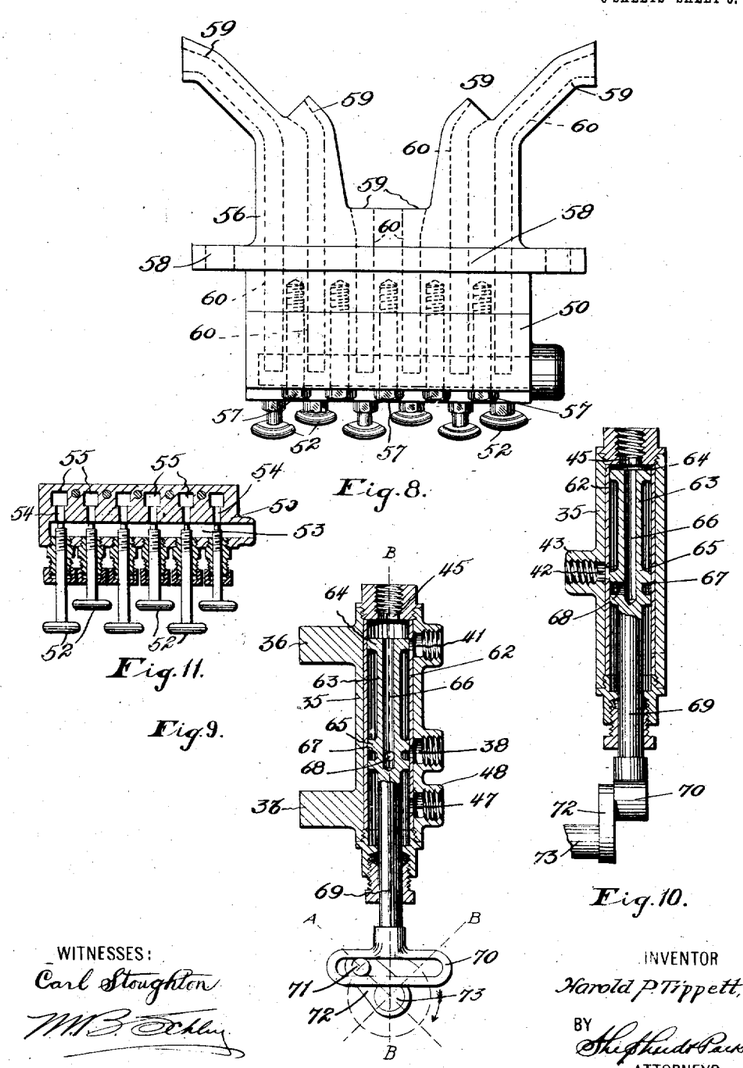

Controlling means comprising a piston valve cylinder 35 is arranged between the cylinders 16. The piston valve cylinder 35 is formed at its upper and lower front portions with integral plate brackets 36 which are suitably engaged with the rear wall 8 of the hopper for supporting the said cylinder in place. The branch pipes 31 hereinbefore described having communication with the ports 30 of the valve chambers 29, are extended and positioned so that those extending from the lower valve chambers will communicate with a short horizontal pipe 37 entering a port 38 provided in the rear side of the cylinder 35 and slightly below the center thereof; while those extending from the upper valve chambers will terminate in a coupling 39 which is arranged on the end of a short pipe 40 extending forwardly and entering a port 41 provided immediately over the port 38 and slightly below the upper end of the piston valve cylinder. At one side the piston valve cylinder is provided with a port 42 and a nipple 43 into which is inserted the lower curved end of a vertical steam supply pipe 44. In the upper head of the cylinder, an exhaust port 45 is provided and an exhaust pipe 46 is threaded into the head so as to have communication with the said port. Below the port 38, but some distance above the lower end of the cylinder 35, a port 47 is provided, while a screw threaded nipple 48 is formed about the port. A horizontal blast pipe 49 extends from the nipple behind and beyond the right hand cylinder 16, as shown in Fig. 3. The blast pipe comprises a vertical portion communicating with the horizontal portion at its upper end and having communication with another horizontal portion at its lower end, the said lower horizontal portion entering a manifold 50 arranged below the fire door and supported on the door frame 3. In the vertical portion of the blast pipe a globe valve 51 is arranged, so that the amount of steam passing down through the blast pipe may be regulated or controlled. The manifold 50 as more clearly shown in Figs. 8 and 11 is provided with a plurality of valve stems 52 which pass through a common supply chamber 53, into which the steam is delivered from the blast pipe 49. Short vertical passages 54 extend upwardly from the chamber 53 and into the lower ends of these passages the valve stems 52 enter, being arranged to either close the passages or to open them as desired, so that the quantity of steam admitted into each passage may be independently regulated or controlled. Each passage terminates at its upper end in a horizontal opening or passage 55.

The manifold is secured to the outer face of an ejector 56 by means of screw bolts 57. The ejector is formed with a surrounding flange 58 which is secured to the inner side of the door frame 3 so that a portion of the ejector extends through the frame to receive the manifold. That portion of the ejector extending forwardly from the flange, lies along the lower portion of the fuel opening 2 and comprises a plurality of differently directed and connected or integral jets 59, each of which is provided with a longitudinal passage 60 extending through the ejector and registering with one of the openings 55 of the manifold. The ejector is arranged so that its outermost jets extend over the inner edge of the fuel distributing table 15 hereinbefore referred to. The fuel table 15 is supported from the inner side of the double wall 1 at the lower edge of the fuel opening 2 and is provided with a dished upper surface 61. The jets being arranged at different angles or differently directed as described, will eject the steam against the fuel which is received on the table so as to scatter the same to all parts of the combustion chamber and in various directions, thus evenly spreading or distributing the same. By means of the valves 52 the force of the steam or fluid admitted to each passage 60 may be regulated so that the amount of fuel distributed to the different parts of the combustion chamber may be controlled and regulated and thus the fuel distributed with respect to the draft of the furnace.

Again referring to the controlling means or the piston cylinder 35, it will be apparent that the entire operation of the stoker may be controlled from this point as the steam must first enter into the cylinder through the port 42 before it can be distributed to the cylinders 16 and the blast pipe 49. I will now proceed to give a description of the various parts of the controlling means, The cylinder 35 is provided with a snugly fitting casing or sleeve 62 which is provided with suitable openings or apertures registering with each of the ports 38, 41, 42 and 47. Within the casing or sleeve, a piston valve 63 is arranged, said piston valve being somewhat smaller in diameter than the inner diameter of the casing and having at its upper end a single head 64 and at its lower end a double head 65, the heads being constructed to fit snugly in the sleeve 62 and form steam tight joints therewith, so as to prevent steam confined between the heads from passing the same. The piston valve is also provided with a vertical central passage 66 which extends through the upper single head so as to have communication with the exhaust port 45, while at its lower end it has communication with an annular groove 67 formed about the double head by means of a horizontal port 68 as clearly shown in Fig. 10. A piston rod 69 extends downwardly from the piston valve through the cylinder and carries at its lower end a horizontal cross link 70 in which a wrist pin 71 is adapted to travel, said wrist pin being carried on the end of a crank arm 72 keyed upon a shaft 73. The shaft 73 is suitably supported in bearing boxes 74 mounted on the braces 7. At its extreme outer end which projects beyond the left hand cylinder 16 (see Fig. 3) the shaft carries a worm wheel 75 and beyond the worm wheel supports a yoke 76 which is engaged at its upper end about a worm shaft 77, the said worm shaft being connected and driven by a suitable motor 78 arranged on the side of the hopper 5, as clearly shown in Fig. 2. The motor 78 is suitably arranged and operated so as to be controlled to revolve the shaft 73 at the desired rate of speed. In this way the number of revolutions of the crank 72 and vertical movements or reciprocations of the piston valve 63 in a given time, may be predetermined.

For the purpose of more clearly explaining the operation of the parts, I have divided a complete revolution of the crank 72 into four periods or quarters which are indicated by the dotted lines A—B (see Fig. 9). Referring to Fig. 9, the crank 72 is shown at the beginning of the top or first quarter, the upper single head 64 of the piston valve just about to uncover the upper port 41 and steam being admitted by the port 42 between the upper and lower heads of the piston valve. It might be here stated that at no point during the stroke of the piston valve is the steam cut off from the port 42 or the said port covered, that is, steam is being admitted to the cylinder between the piston heads at all times. The parts being in these positions, I will now proceed to give a description of the complete operation of the stoker, which is as follows: The piston heads 18 being at the upper ends of their stroke in the steam cylinder 16, the bucket 12 is in its loading position as shown in Figs. 3 and 4, the said figures, however, showing the valve 63 in its position when the crank 72 is at the middle of its third quarter of a revolution. The position of the piston valve 63 is shown in Fig. 9. With the piston valve in this position steam is cut off from the port 47 and the blast pipe 49, the port 38 being also closed. When the piston head moves upward, the port 38 is opened to the groove 67 of the double head 65 of the piston valve, so that the exhaust may pass from the cylinders through the lower ports 32 and 30 of the lower valve chambers 29 by way of the branch pipes 31 to the short horizontal pipe 37 which will convey the exhaust from both cylinders to the port 38, from which it will pass about the groove 67 through the port 68 and into the vertical passage 66 of the piston valve and from thence up through the cylinder and out the exhaust port 45 to the exhaust pipe 46. As the crank arm begins to travel the first quarter, the pin 71 traveling in the cross link 70, will force the piston valve upwardly, thus causing the upper head 64 to uncover the port 41 simultaneously as the lower head 65 uncovers the port 38, thereby permitting the steam from between the heads to pass out the port 41 to the short pipe 40 into the coupling 39 and from thence to the upper branch pipes 31, by which it is carried to the ports 30 of the upper valve chambers 29, unseating the check valves 34 and passing above the pistons 18, thereby starting them on their downward stroke. The downward stroke of the pistons, causes the racks 20 to be moved downward and the bucket 12 inverted to its unloading position and thus the charge of fuel delivered to the chute 11, from which it will pass by gravity to the table 15, the piston heads continuing on their downward stroke and being cushioned at the lower end as hereinbefore described. This condition exists during the passage of the crank arm through the first or top quarter as indicated by the lines A—B. I would like to call attention at this point, to the fact that the fuel is delivered to the table 15 and given time to arrive at that point before steam is admitted to the ejector 56. When the crank arm 72 arrives at the end of the first quarter on the dotted line B, the piston valve will have begun its downward stroke or movement, thus cutting off the supply of steam through the port 41 and from the upper portions of the steam cylinder. During the second quarter movement from the line B to the line A, the port 38 is uncovered and steam permitted to pass therethrough to the pipe 37, from which it will be conveyed by the pipes 31 to the ports 30 of the lower valve chambers of the steam cylinders. Steam entering through the ports 30 will unseat or depress the check valves 34 and pass by way of the ports 33 to the underside of the piston heads, thus starting them on their upward stroke which is carried out in the manner heretofore described, causing the rack bars 20 to be drawn upward, which revolves or oscillates the bucket 12, thus returning it to its normal or loading position. Fuel having been delivered on to the table 15 and the bucket returned to its normal position so as to prevent steam from passing up through the chute 11 into the hopper, the conditions are right for the distribution of the fuel in the combustion chamber. The third or bottom quarter of the revolution of the crank arm 72 continues the downward movement of the piston valve, so as to uncover the port 47 and allow the steam to pass therethrough to the blast pipe 49 by which it will be conveyed to the manifold 50. The valves 52 having been set, the steam in the desired quantities is admitted to the opening 55 from which it will flow into the passages 60 to the jets 59. The steam escaping through the jets will scatter and distribute the fuel from the table 15, to the various parts of the combustion chamber and evenly spread the same over the fire bed. When the crank 72 reaches the center of the bottom or third quarter (as shown in Fig. 4) the piston valve will be at the extreme end of its lower stroke and will be carried upward during the remainder for the said quarter, during which remainder, however, the blast port 47 is maintained open. As the crank reaches the end of the said quarter, the lower double head 65 of the piston valve closes the port 47, thus cutting off the supply of steam from the blast pipe. It will be noted that during the third quarter, the port 38 is open to the steam supply so that steam is conveyed to the lower ends of the steam cylinders to hold the piston heads up and maintain the bucket in its loaded position. During the fourth or last quarter of the revolution of the crank 72, the said port 38 is still open, but the ports 41 and 47 closed, so that the parts remain inactive.

In summing up the above operations, it will be found that during the first quarter, the pistons are forced downward and the load from the bucket discharged. During the third or bottom quarter, steam is discharged from the ejector to distribute the fuel from the table on which it has been allowed to accumulate during the second quarter, while during the second quarter the bucket is returned to its loading position, by the raising or elevation of the piston heads, in which position they are maintained through the last part of the second, third and fourth quarters or through three-fourths of the revolution of the crank arm 72.

It is to be observed that when steam is being admitted into either end of the cylinder, through either the ports 32 or 33, the check valves 26 in the cushioning chambers 25, will be held to their seats as the steam will pass through the ports 28 and merely act to hold the said valves more firmly on their seats. By this arrangement the steam is prevented from passing by way of the passage 24 around the piston head 18, which would occur if the check valves 26 were not provided. It is also to be observed that the gradual cushioning produced after either of the ports 32 are closed by the piston head, would be sufficient to probably cushion the head and absorb all jar where the device was being operated under low pressure. The cushioning passages 24 and the valve chambers and valves 25 and 26 and the ports 28 could thus be dispensed with and the successful operation of the device in no way effected. Of course where the stoker is being used in connection with a high pressure boiler furnace, the cushioning passages and valves will be necessary.

Attention is called to the specific construction and disposition of the ejector 56. Referring to Figs 1 and 4, it will be noted that the ejector rests in the fuel opening 2 and does not extend over the table 15, so that when the charge of fuel has been delivered to the table, the ejector will be beneath and behind the fuel, thus causing the steam discharged from the jets to distribute the fuel with more precision and some of the jets projecting beyond the others, different points in the body of fuel will be affected by the steam discharged and the fuel thus more evenly distributed.

Having now fully described my invention, what I claim and desire to secure by Letters Patent is,

1. In a mechanical stoker, the combination with a furnace and the combustion chamber thereof, of means for feeding fuel to the combustion chamber, fluid operated means for operating the fuel feeding means, fluid pressure means for distributing the fuel in the combustion chamber, and fluid controlling means comprising a piston valve cylinder having a supply port, an exhaust port, ports having communication with the fluid operated means and a blast port having communication with the fluid pressure distributing means, and a piston valve working in the cylinder arranged to establish communication between the supply port and the blast port and also arranged to establish communication between the supply port and one of the ports having communication with the fluid operated means and between the exhaust port and the other port having communication with said means prior to establishing communication between the supply port and the blast port.

2. In a mechanical stoker, the combination with a furnace and the combustion chamber thereof, of means for feeding fuel to the combustion chamber, fluid operated means for operating the fuel feeding means, fluid pressure means for distributing the fuel in the combustion chamber, and fluid controlling means comprising a piston valve cylinder having a supply port, an exhaust port, ports having communication with the fluid operated means and a blast port having communication with the fluid pressure distributing means, a piston valve working in the cylinder arranged to establish communication between the supply port and the blast port and also to establish communication between the supply port and one of the ports having communication with the fluid operated means and between the exhaust port and the other port having communication with said means prior to establishing communication between the supply port and the blast port, and means for operating said valve.

3. In a mechanical stoker, a combustion chamber, fuel feeding means, fluid operated means for operating said fuel feeding means, fluid pressure means for distributing fuel in the combustion chamber, means for controlling the supply and exhaust fluid to and from the fluid operated means and the fluid pressure means, and revolving means operating the controlling means to cause the same to supply fluid to the fluid operated means during the first quarter of the revolution of the revolving means to operate the fuel feeding means, to supply fluid to the said fluid operated means to return the feeding means during the second, and to hold the said feeding means against operation during the third and fourth quarters of the revolution of said revolving means, and to supply fluid to the fluid pressure distributing means during the third quarter of the revolution.

In testimony whereof I affix my signature in presence of two witnesses.

HAROLD P. TIPPETT.

Witnesses:
CARL STOUGHTON,
M. B. SCHLEY.